(12) United States Patent
Shioji et al.

(10) Patent No.: US 8,186,474 B2
(45) Date of Patent: May 29, 2012

(54) WHEEL LOADER

(75) Inventors: Hiroyuki Shioji, Hirakata (JP);
Toshifumi Ogihara, Tokorozawa (JP);
Akio Miyane, Tokyo (JP); Takeshi Kamimae, Nomi (JP)

(73) Assignees: Komatsu Ltd., Tokyo (JP); Komatsu Utility Co., Ltd., Tokyo (JP)

( * ) Notice: Subject to any disclaimer, the term of this patent is extended or adjusted under 35 U.S.C. 154(b) by 314 days.

(21) Appl. No.: 12/517,869

(22) PCT Filed: Dec. 7, 2007

(86) PCT No.: PCT/JP2007/073638
§ 371 (c)(1),
(2), (4) Date: Jun. 5, 2009

(87) PCT Pub. No.: WO2008/069297
PCT Pub. Date: Jun. 12, 2008

(65) Prior Publication Data
US 2010/0320807 A1    Dec. 23, 2010

(30) Foreign Application Priority Data
Dec. 8, 2006  (JP) .................. 2006-332076

(51) Int. Cl.
*B62D 21/02*  (2006.01)
*B62D 21/03*  (2006.01)
(52) U.S. Cl. ........ 180/312; 280/781; 296/35.1; 296/204
(58) Field of Classification Search .............. 180/311, 180/312; 280/781, 785, 790, 795, 799, 800, 280/107; 296/203.01, 204, 203.04, 35.1
See application file for complete search history.

(56) References Cited

U.S. PATENT DOCUMENTS

| | | | |
|---|---|---|---|
| 3,604,527 A * | 9/1971 | Price | 180/344 |
| 4,182,456 A * | 1/1980 | Paul | 414/685 |
| 5,535,533 A | 7/1996 | Romanchok | |
| 6,799,936 B2 | 10/2004 | Sprinkle | |
| 7,530,779 B2 | 5/2009 | Holloway et al. | |
| 7,559,250 B2 * | 7/2009 | Seitz et al. | 73/799 |
| 7,757,805 B2 * | 7/2010 | Wakuta et al. | 180/312 |
| 7,775,556 B2 * | 8/2010 | Sakamoto et al. | 280/781 |

(Continued)

FOREIGN PATENT DOCUMENTS

EP    0 833 012 A1    4/1998

(Continued)

OTHER PUBLICATIONS

Related U.S Appl. No. 12/516,072, Inventor: Hiroshi Shoji et al., entitled: Wheel Loader, filed May 22, 2009.

(Continued)

*Primary Examiner* — Joseph Rocca
(74) *Attorney, Agent, or Firm* — Holtz, Holtz, Goodman & Chick, PC

(57) ABSTRACT

A wheel loader includes a rear frame having left and right plate-shaped main beams. A reinforcing bracket is provided at an upper position substantially in a middle of a front-and-rear direction of the rear frame, and the reinforcing bracket bridges between the main beams. A substantially middle position of the rear frame exhibits a closed-section structure that includes the reinforcing bracket. The closed-section structure at the main beams specifically includes an axle support, a reinforcing plate, a reinforcing rib and the reinforcing bracket in the order from a lower side to an upper side.

12 Claims, 4 Drawing Sheets

U.S. PATENT DOCUMENTS

| | | | |
|---|---|---|---|
| 7,832,519 B2 * | 11/2010 | Sakamoto et al. | 180/312 |
| 7,866,700 B2 * | 1/2011 | Weibling et al. | 280/781 |
| 2004/0239092 A1 * | 12/2004 | Haringer | 280/781 |
| 2005/0045351 A1 | 3/2005 | O'Brien et al. | |
| 2005/0167969 A1 * | 8/2005 | Fukazawa et al. | 280/785 |
| 2006/0001250 A1 * | 1/2006 | Fukazawa et al. | 280/781 |
| 2007/0056786 A1 * | 3/2007 | Fukazawa et al. | 180/89.12 |
| 2007/0145780 A1 * | 6/2007 | Tecklenburg et al. | 296/190.08 |
| 2008/0035404 A1 * | 2/2008 | Dahl et al. | 180/233 |
| 2010/0098522 A1 | 4/2010 | Shioji et al. | |

FOREIGN PATENT DOCUMENTS

| | | |
|---|---|---|
| JP | 1-152881 U | 10/1989 |
| JP | 8-199619 A | 8/1996 |
| JP | 10-114958 A | 5/1998 |
| JP | 2003-184122 A | 7/2003 |
| JP | 2004-276881 A | 10/2004 |
| JP | 2005-68993 A | 3/2005 |
| JP | 3730291 B2 | 10/2005 |
| JP | 2006-168612 A | 6/2006 |
| WO | WO 2006098084 A1 * | 9/2006 |

OTHER PUBLICATIONS

International Preliminary Report on Patentability and Written Opinion of the International Searching Authority dated Jun. 10, 2009 (8 pages), issued in counterpart International application No. PCT/JP2007/073638.

* cited by examiner

WHEEL LOADER

This application is a U.S. National Phase Application under 35 USC 371 of International Application PCT/JP2007/073638 filed Dec. 7, 2007.

TECHNICAL FIELD

The present invention relates to a wheel loader, and in particular to the structure of a rear frame of a rear vehicle body.

BACKGROUND ART

To date, in order to improve forward visibility, it has been proposed that a canopy for covering a perch is supported by two poles in a bulldozer or the like (patent document 1). The patent document 1 discloses that, in order to enhance rigidity of support members for such poles, such support members are shaped like a box having a closed-section structure. According to the patent document 1, such an arrangement not only can enhance forward visibility but also can prevent oscillation of such support members during traveling.

Many wheel loaders use a two-legged canopy similar to the one disclosed in the patent document 1. In addition, adoption of ROPS (roll over protective structure) as a safety standard has been recommended in recent years.

Patent Document 1: JP-UM-A-1-152881

DISCLOSURE OF THE INVENTION

Problems to be Solved by the Invention

However, according to the patent document 1, lower ends of the two poles are merely attached to the support members of the closed-section structure, and no consideration is made over a structure for holding the support members. It is difficult to satisfy a standard that is as high-level as the ROPS merely by reinforcing the support structure for the two poles, and realization of more rigid frame structure has been demanded. Particularly, while, in a rear frame of a wheel loader where left and right main beams serve as the primary structural components, rigidity for the entire rear frame has been secured by bridging the main beams with a floor plate or the like, there has been a limit on rigidity enhancement achievable with such rigidity securing. Thus, satisfaction of the ROPS has been difficult.

An object of the invention is to provide a wheel loader capable of reliably enhancing rigidity of a rear frame with a simplified structure.

Means for Solving the Problems

A wheel loader according to an aspect of the invention includes: a rear frame including left and right plate-shaped main beams, in which a reinforcing bracket is provided at an upper position substantially in a middle of a front-and-rear direction of the rear frame, the reinforcing bracket bridging between the main beams, and a substantially middle position of the rear frame exhibits a closed-section structure that includes the reinforcing bracket.

Herein, the "substantially middle position" means, for instance, a position behind a perch or an operator's seat at which heavy loads such as an engine are installed. Additionally, the "closed-section structure" means a closed structure formed by disposing components of the rear frame within the maximum width of the reinforcing bracket such that such components surrounds an axis parallel to the front-and-rear direction.

According to the aspect of the invention, since the closed-section structure of the rear frame includes the reinforcing beam that bridges the upper portions of the main beams, a vertical load and a horizontal load applied on the main beams can be favorably resisted, and rigidity of the rear frame can be reliably enhanced with a simplified structure.

In the wheel loader according to the aspect of the invention, the reinforcing bracket is provided with a mounting portion for mounting a column that forms a perch.

According to the aspect of the invention, since the column that forms the perch, which corresponds to each pole for a two-legged canopy in a structure described in exemplary embodiments, is mounted on the reinforcing bracket, a load applied from the canopy can be reliably borne by the closed-section portion via the reinforcing bracket, and deformation and the like of the rear frame can be prevented. Thus, a standard such as the ROPS can be sufficiently satisfied.

In the wheel loader according to the aspect of the invention, a reinforcing rib is provided at the substantially middle position of the rear frame to extend along an up-and-down direction of each of the main beams, and the closed-section structure further includes the reinforcing rib.

According to the aspect of the invention, since the reinforcing rib is provided to extend along the up-and-down direction of each of the main beams, enhancement of rigidity with the closed-section structure can be reliably conducted.

In the wheel loader according to the aspect of the invention, the rear frame is provided with a base plate on which an engine is installed via a mount, and the mount placed on the base plate abuts on the reinforcing rib.

According to the aspect of the invention, since the reinforcing rib functions as a stopper for the mount, the mount can be stably positioned.

In the wheel loader according to the aspect of the invention, a plate-shaped axle support is provided at a lower position substantially in the middle of the front-and-rear direction of the rear frame, the axle support bridging between the main beams, and the closed-section structure further includes the axle support.

According to the aspect of the invention, since the closed-section structure includes the axle support that is typically a thick plate, a rear axle can be stably supported, and the closed-section structure as a whole can reliably resist a load applied from the rear axle, thereby enhancing traveling performance.

In the wheel loader according to the aspect of the invention, the reinforcing bracket is provided with a mounting portion for mounting a column that forms a perch.

In the wheel loader according to the aspect of the invention, the reinforcing bracket is provided with a support portion for supporting an engine hood openably and closably.

According to the aspect of the invention, since the reinforcing bracket supports the floor plate and the engine hood as well, supporting strength therefor can be enhanced. Thus, an operator on the floor plate does not feel a lack of rigidity, or does not feel meagerness when opening or closing the engine hood.

BEST MODE FOR CARRYING OUT THE INVENTION

Figure 1:
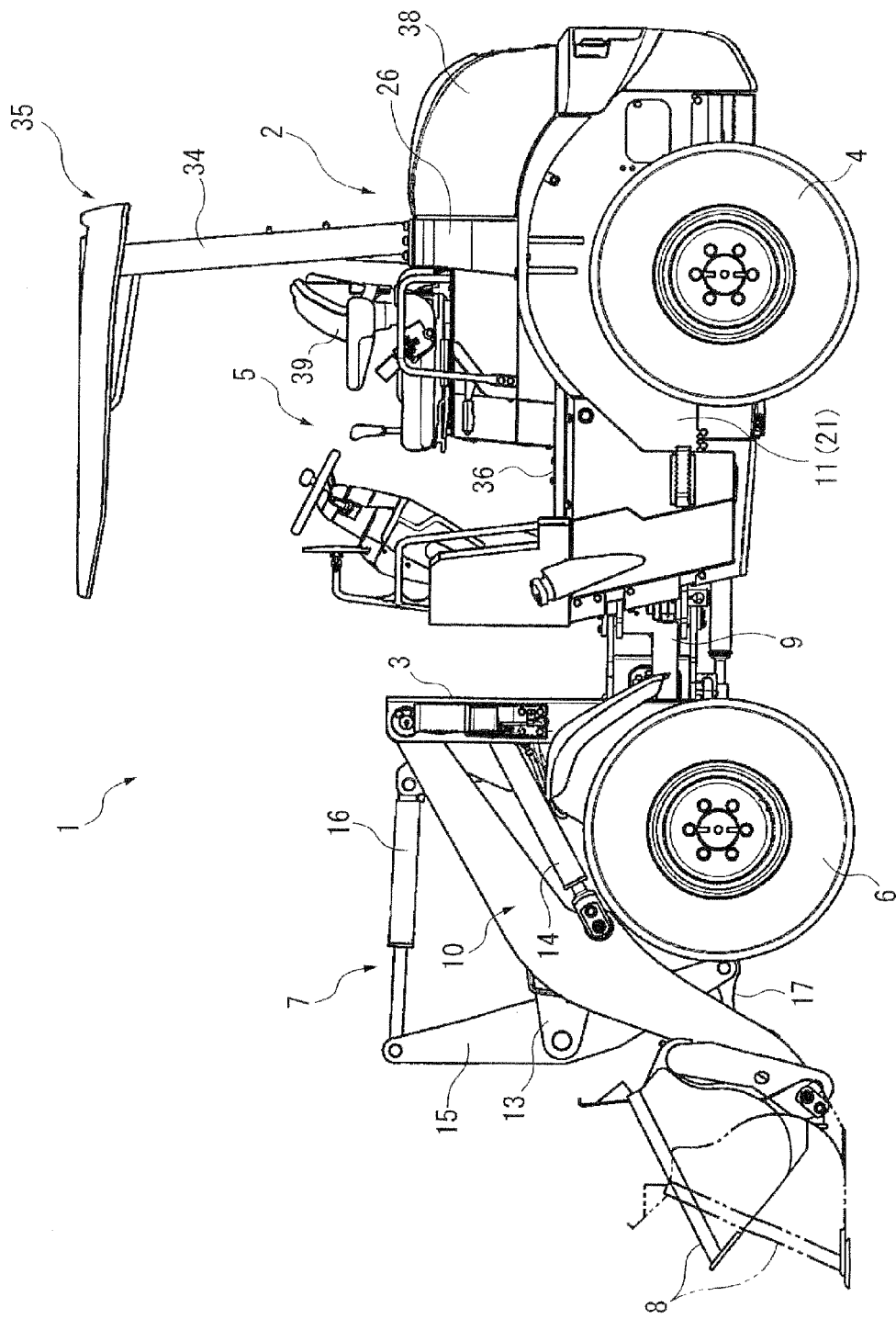
FIG. 1 is a side view showing an entire wheel loader according to an exemplary embodiment of the present invention.

An exemplary embodiment of the invention will be described below with reference to the drawings. FIG. 1 is a side view showing an entire wheel loader 1 according to this exemplary embodiment.

The wheel loader 1 in this exemplary embodiment has an operating mass of around 2.5 t, and has a structure in which a front frame 3 is articulatably attached to a rear vehicle body 2. A rear frame 11 of the rear vehicle body 2 is provided with rear wheels 4 and a perch 5, and also houses an engine and a power line that includes a hydraulic pump(s) driven by the engine, a transmission(s) and the like (none of which is shown). A seat 39 included in the perch 5 is provided above the not-shown engine. A canopy 35 including two poles 34 is provided behind the scat 39. The front frame 3 is provided with front wheels 6. A working equipment 7 is provided anterior to the front frame 3. A bucket 8 is attached to the distal end of the working equipment 7.

Of these, the working equipment 7 includes a bucket boom 10 that has its base end coupled to the upper side of the front frame 3 and its distal end coupled to the bucket 8. An intermediate portion of the bucket boom 10 and an upper portion of the front frame 3 are coupled by a boom cylinder 14. By extension/retraction of the boom cylinder 14, the boom 10 is raised and lowered at its front side, vertically moving the bucket 8.

A tilt lever 15 is rotatably supported via a bracket 13 on the boom 10. An upper end of the tilt lever 15 and the upper side of the front frame 3 are coupled by a tilt cylinder 16 while a lower end of the tilt lever 15 and the bucket 8 are coupled by a tilt rod 17. Accordingly, the bucket 8 is tilted by the extension/retraction of the tilt cylinder 16.

Figure 2:
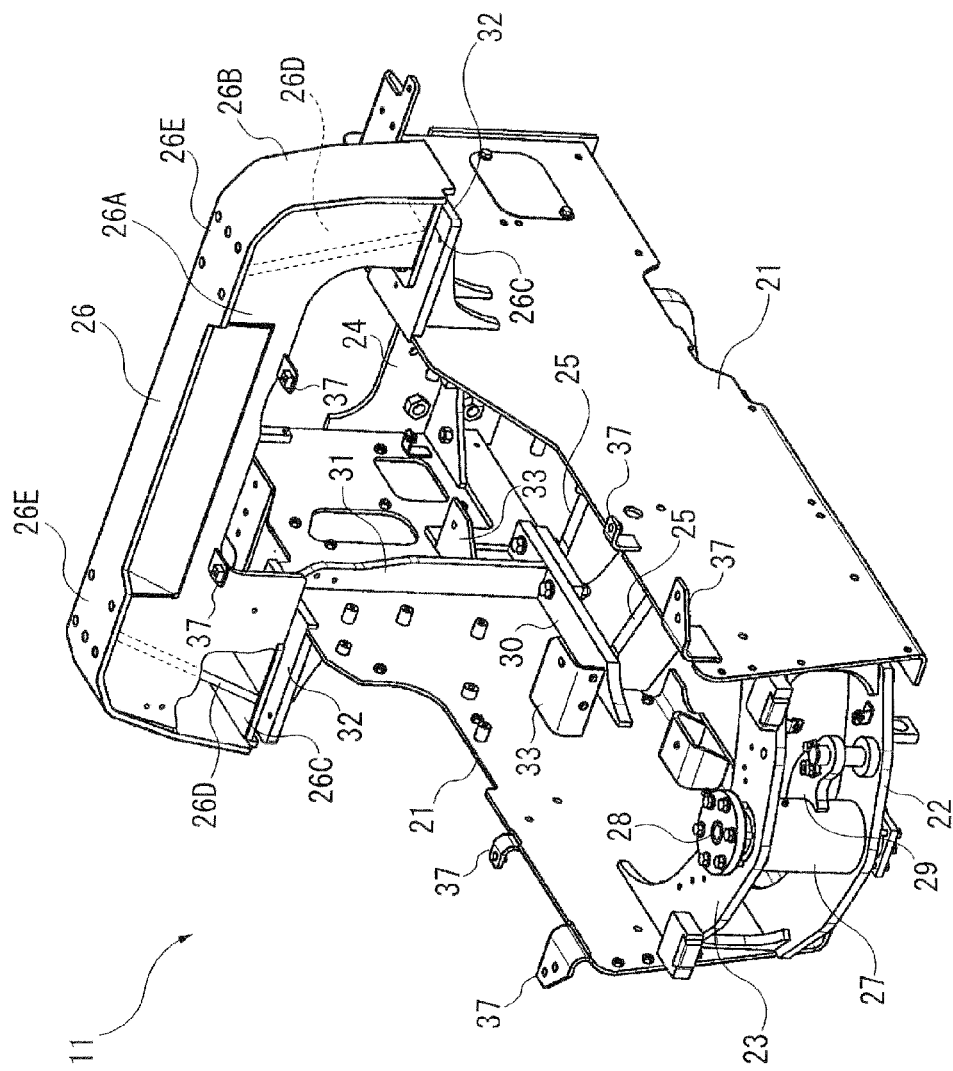
FIG. 2 is a perspective view showing an entire rear frame.
Figure 3:
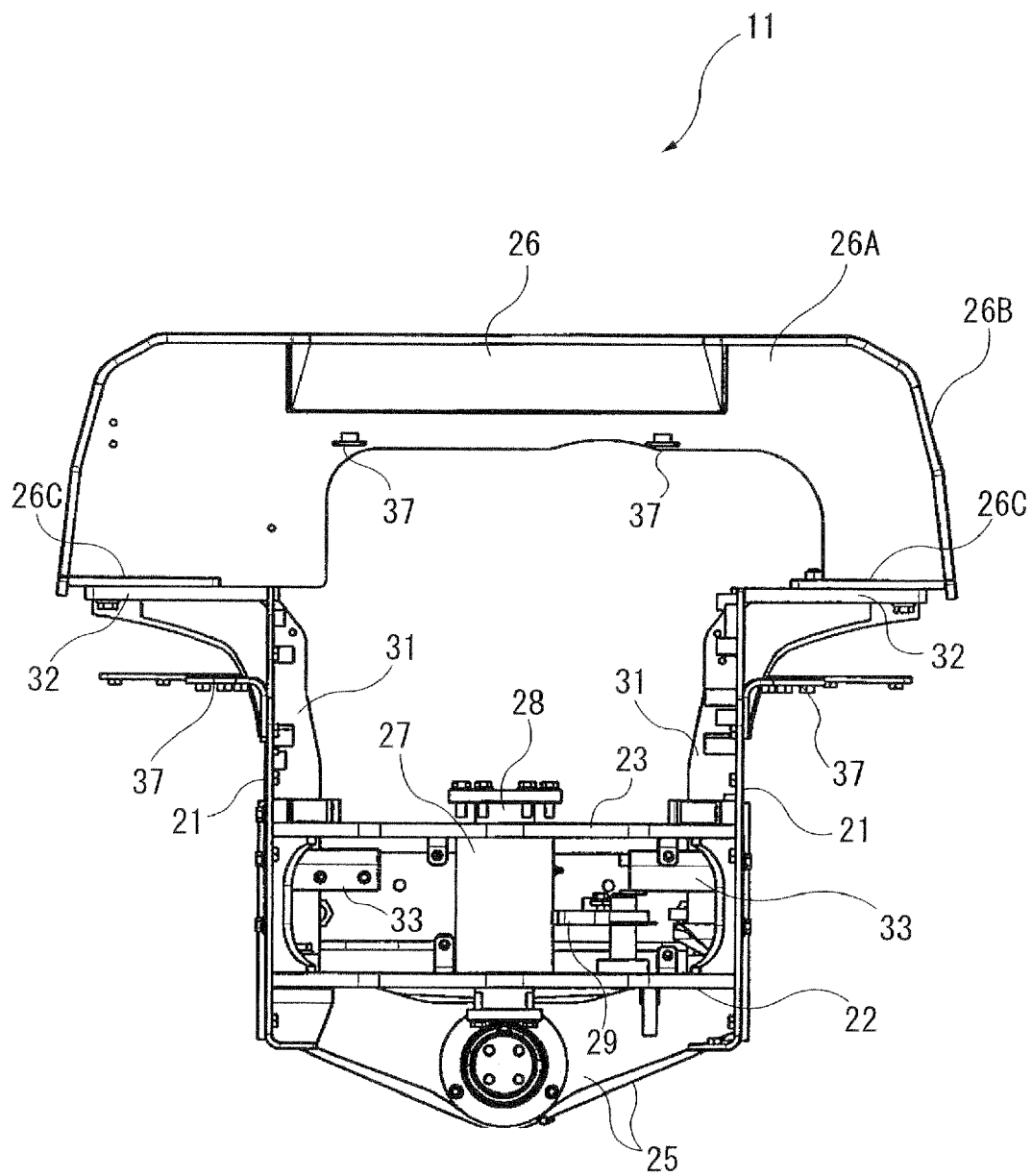
FIG. 3 is a front view of the rear frame.
Figure 4:
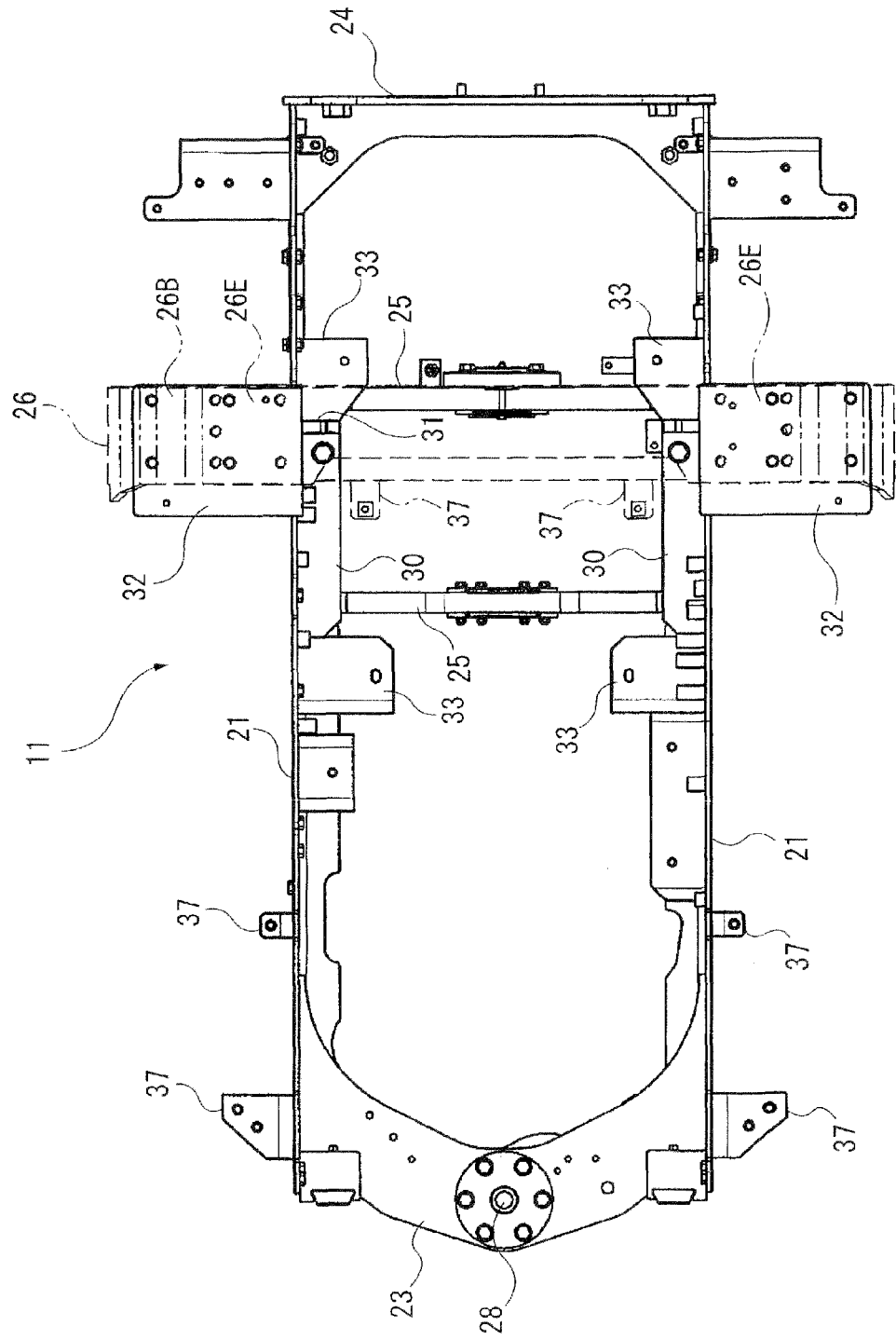
FIG. 4 is a plan view showing the rear frame.

The rear frame 11 will be described in detail below with reference to FIGS. 2 to 4. FIG. 2 is a perspective view showing the rear frame 11 in its entirety. FIG. 3 is a front view of the rear frame 11. FIG. 4 is a plan view showing the rear frame 11.

The rear frame 11 includes: plate-shaped left and right main beams 21; a bottom plate 22 and a top plate 23 that couple front ends of the main beams 21 together; a rear plate 24 that couples rear ends of the main beams 21 together; a pair of thick-plate-shaped front and rear axle supports 25 that couple lower portions of the main beams 21 together substantially at their middles; and a reinforcing bracket 26 that couples upper portions of the main beams 21 together substantially at their middles.

A boss 27 is provided between the bottom plate 22 and the top plate 23 (the plates located at the front side), into which an articulate pin 28 is inserted. A bottom plate and a top plate of the front frame 3 (FIG. 1) are respectively bolted to lower and upper ends of the articulate pin 28, so that the front frame 3 is rotatable around the articulate pin 28. The front frame 3 is rotated by an articulate cylinder 9 (FIG. 1) that couples the front frame 3 with an arm 29 of the boss 27. A rear axle (not shown) is swingably mounted between the front and rear axle supports 25.

Thick-plate-shaped reinforcing plates 30 are provided on inner surfaces of the main beams 21 at positions where the axle supports 25 are jointed, and extends in the front-and-rear direction in a bridging manner. Further, reinforcing ribs 31 extends from top surfaces of the reinforcing plates 30 upwardly in the up-and-down direction at positions between the front and rear axle supports 25. Upper ends of the reinforcing ribs 31 extend substantially to upper edges of the main beams. The reinforcing ribs 31 inwardly protrude by substantially the same dimension as the reinforcing plates 30 inwardly protrude.

On the inner surface of each main beam 21, base plates 33 for mounting the engine are provided respectively at front and rear positions between which the reinforcing rib 31 is interposed. The engine is mounted to the base plates 33 via suitable mount(s). In other words, the axle supports 25 juxtaposed in the front-and-rear direction of the vehicle and the base plates 33 for mounting the engine are located substantially at the middle portion of the rear frame 11, and the reinforcing ribs 31 are provided on the inner surfaces of the main beams to be interposed between the axle supports 25 and between the base plates 33.

The reinforcing bracket 26 is provided in a bridging manner at a position corresponding to upper-end positions of the reinforcing ribs 31. Specifically, mounting bases 32 that protrude outwardly and horizontally are provided on outer surfaces of the main beams 21 at positions corresponding to the upper end positions of the reinforcing ribs 31. Ends of the reinforcing bracket 26 are detachably fixed to the mounting bases 32 by bolting. The reinforcing bracket 26 bridges the rear frame 11 while extending across and above the engine installed in the rear frame 11. The reinforcing bracket 26 is mounted thereto after the engine is installed, and detached and attached also when the engine is to be removed for some reason. The reinforcing bracket 26, which is structured such that an outer edge of a substantially gate-shaped plate member 26A is provided with a planarly-shaped outer-circumferential portion 26B, is bolted to the mounting bases 32 with use of mounting pieces 26C respectively fixed on the ends of the plate member 26A. As shown in FIG. 2 in a partially cutaway manner, reinforcing ribs 26D are provided in contact with upper surfaces of the mounting pieces 26C, a lower surface of the outer-circumferential portion 26B and a rear surface of the plate member 26A. The reinforcing bracket 26 is a member having greater strength on its own. While the outer-circumferential portion 26B has a decorated surface for vehicle exterior in this exemplary embodiment (FIG. 1), the outer-circumferential portion 26B may be attached with any other exterior component(s).

With this structure, the vicinity of the substantially middle portion of the rear frame 11 in the front-and-rear direction provides a closed-section structure within the width of the reinforcing bracket 26, in order to enhance rigidity of the rear frame 11, particularly rigidity of the main beams 21. Specifically, the axle supports 25, the reinforcing plates 30 and the reinforcing ribs 31 provided on the main beams 21, and the reinforcing bracket 26 (following the down-to-up order) provide a structure for wholly closing the rear frame 11, thereby imparting enhanced rigidity to the rear frame 11 in the vicinity of its middle.

As shown in FIG. 4, the reinforcing bracket 26 and the axle support 25 preferably have such an anteroposterior relationship that the axle support 25 is provided at a position projected within a vehicle-anteroposterior width of the reinforcing bracket 26. On the other hand, the axle supports 25 disposed in the front-and-rear juxtaposition to couple the left and right main beams 21 are bridged by the thick reinforcing plates 30 provided at the positions where the axle supports 25 are jointed and extending in the front-and-rear direction, thereby enhancing rigidity of the main beams 21 between the front and rear axle supports 25. The above arrangement is for the main frames to sufficiently resist a force transmitted thereto from the road surface through an axle. In other words, the position of the axle support 25 in the above-described closed structure is not limited to such a position projected within the vehicle-anteroposterior width of the reinforcing bracket 26 as shown in FIG. 4, but may be any other position as long as the reinforcing plates 30 provided on the main beams 21 are taken into account.

Accordingly, in this exemplary embodiment, while a vertical load during traveling is applied on the vicinity of the middle of the rear frame 11 with a rear axle being mounted on the axle supports 25, such a load can be favorable resisted.

On the inner surface of each main beam 21, the base plates 33 for mounting the engine are provided respectively at the front and rear positions between which the reinforcing rib 31 is interposed, and the engine is mounted to the base plates 33 via suitable mount(s). Even when the engine is mounted, the load thereof can be reliably borne by the vicinity of the middle of the rear frame 11 having higher rigidity. Thus, deflection and the like of the main beams 21 can be reliably prevented.

Rear-side leading edges of the base plates 33 are arranged close to the reinforcing ribs 31. By an abutment of the mount(s) mounted on the base plates 33 to the reinforcing ribs 31, unnecessary displacement of the mount(s) is prevented. In other words, the reinforcing ribs 31 included in a highly-rigid portion also serve as a stopper for the mount(s).

Referring back to FIG. 1, the wheel loader 1 is provided with the canopy 35 including the two poles 34. Lower ends of the poles 34 are bolted to mount portions 26E provided to the reinforcing bracket 26. In case that the wheel loader 1 should be overturned, a load incurred in the overturn is applied locally to the rear frame 11 via the two poles 34 due to the canopy 35 structured in a two-legged manner. However, with the poles 34 being mounted on the reinforcing bracket 26, the vicinity of the middle of the rear frame 11 including the reinforcing bracket 26 and having high rigidity can reliably resist such a load. Thus, ROPS can be sufficiently satisfied.

In place of the canopy 35, a cab may be mounted. While some cab-style loader further requires a ROPS guard, such a ROPS guard has substantially the same structure as the canopy. When a cab satisfies the ROPS only by its frame structure without using such a ROPS guard, a rear end of such a cab is bolted to the mounting portions of the reinforcing bracket 26 (the number of bolts and their locations may differ from a canopy-style loader, though). When a cab has a skeleton structure for its frame, a column on a rear side of the cab is disposed on the reinforcing bracket 26. Such a column serves as the pole(s) 34 of the canopy structure and effectively transmits a load incurred in an overturn to the rear frame 11.

In addition, a front surface of the reinforcing bracket 26 and upper edges of the main beams 21 are provided with mounting pieces 37 for mounting a floor plate 36 (FIG. 1). In other words, the floor plate 36 is partially supported by the reinforcing bracket 26. Accordingly, while the floor plate 36 is applied with a relatively large load due to installation of the seat 39 and riding of an operator, such a load applied on the floor plate 36 can be favorably borne partially by the reinforcing bracket 36. Thus, an operator can recognize a higher degree of frame rigidity and enjoy comfortable maneuverability.

Further, when the seat 39 is disposed anterior to the reinforcing bracket 26 provided substantially at the middle of the rear frame, the engine is disposed below the seat 39. Thus, when the seat 39 is detachable from the perch, an engine inspection not performable from an engine hood 38 side can be easily performed.

On the other hand, an engine hood 38 (FIG. 1) is openably and closably mounted to a rear portion of the reinforcing bracket 26 via a not-shown suitable hinge (a support portion). Accordingly, since the engine hood 38 is also supported by a portion having high rigidity, the opening and closing of the engine hood 38 can be conducted without discomfort. Thus, an operator can enjoy a sense of security without feeling meagerness.

While the best structures and methods and the like for implementing the invention have been disclosed above, the invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or an object of the present invention.

Accordingly, any descriptions of shape or quantity or the like disclosed above are given as examples to enable easy understanding of the invention, and do not limit the present invention, so that descriptions using names of components, with any such limitations of shape or quantity or the like removed in part or whole, are included in the present invention.

The invention claimed is:

1. A wheel loader, comprising:
    a rear frame comprising:
        left and right plate-shaped main beams;
        mounting bases which protrude horizontally outwardly from outer surfaces of the main beams; and
        a reinforcing bracket which is provided at an upper position substantially in a middle of a front-and-rear direction of the rear frame, the reinforcing bracket bridging between the main beams, and ends of the reinforcing bracket being fixed to the mounting bases;
    wherein the rear frame has a closed-section structure at a substantially middle position thereof, the closed-section structure comprising the reinforcing bracket.

2. The wheel loader according to claim 1, wherein the reinforcing bracket is provided with a mounting portion for mounting a column of a cab structure or a canopy structure.

3. The wheel loader according to claim 1, wherein a reinforcing rib is provided at the substantially middle position of the rear frame to extend along an up-and-down direction of each of the main beams, and the closed-section structure further comprises the reinforcing rib.

4. The wheel loader according to claim 3, wherein the rear frame is provided with a base plate on which an engine is installed via a mount, and the mount placed on the base plate abuts on the reinforcing rib.

5. The wheel loader according to claim 1, wherein a plate-shaped axle support is provided at a lower position substantially in the middle of the front-and-rear direction of the rear frame, the axle support bridging between the main beams, and the closed-section structure further comprises the axle support.

6. The wheel loader according to claim 1, wherein the reinforcing bracket is provided with a mounting portion for mounting a floor plate.

7. The wheel loader according to claim 1, wherein the reinforcing bracket is provided with a support portion for supporting an engine hood openably and closably.

8. A wheel loader, comprising:
    a rear frame comprising left and right plate-shaped main beams,
    wherein at positions substantially in a middle of a front-and-rear direction of the rear frame, the rear frame comprises:
        a reinforcing bracket which is provided to bridge between the main beams at an upper side;
        a reinforcing rib which is provided to extend along a vertical direction of each of the main beams; and
        a plate-shaped axle support which is provided to bridge between the main beams at a lower side;
    wherein the reinforcing rib inwardly protrudes from an inner surface of each of the main beams in a direction extending between the axle support and the reinforcing bracket; and
    wherein the reinforcing bracket, the reinforcing rib and the axle support provide a closed-section structure within a width of the reinforcing bracket when planarly viewed.

9. The wheel loader according to claim 8, wherein the reinforcing bracket is provided with a mounting portion for mounting a column of a cab structure or a canopy structure.

10. The wheel loader according to claim 8, wherein the rear frame is provided with a base plate on which an engine is installed via a mount, and the mount placed on the base plate abuts on the reinforcing rib.

11. The wheel loader according to claim 8, wherein the reinforcing bracket is provided with a mounting portion for mounting a floor plate.

12. The wheel loader according to claim 8, wherein the reinforcing bracket is provided with a support portion for supporting an engine hood openably and closably.

* * * * *